United States Patent [19]

Richter et al.

[11] 3,917,569

[45] Nov. 4, 1975

[54] RECOVERY OF CARBON FROM SYNTHESIS GAS

[75] Inventors: George N. Richter, San Marino; William L. Slater, La Habra; Edward T. Child, Hacienda Heights; John C. Ahlborn, Pomona, all of Calif.

[73] Assignee: Texaco Inc., New York, N.Y.

[22] Filed: June 28, 1974

[21] Appl. No.: 484,006

Related U.S. Application Data

[63] Continuation of Ser. No. 319,407, Dec. 29, 1972, abandoned.

[52] U.S. Cl. .................. 210/21; 48/196; 48/212; 48/215
[51] Int. Cl.² ........................................ B01D 43/00
[58] Field of Search ............ 210/21, 22, 44; 48/196, 48/212, 215

[56] References Cited

UNITED STATES PATENTS

| | | | |
|---|---|---|---|
| 2,903,423 | 9/1959 | Mondria | 210/21 |
| 3,276,995 | 10/1966 | McDonald | 210/21 |
| 3,349,029 | 10/1967 | Cheng | 210/21 |

*Primary Examiner*—Frank A. Spear, Jr.
*Attorney, Agent, or Firm*—T. H. Whaley; C. G. Ries; Robert Knox, Jr.

[57] ABSTRACT

Carbon is recovered from synthesis gas by scrubbing with water and using a two-stage hydrocarbon addition technique to separate the carbon from the water-carbon slurry.

9 Claims, No Drawings

RECOVERY OF CARBON FROM SYNTHESIS GAS

This is a continuation of application Ser. no. 319,407, filed Dec. 29, 1972, now abandoned.

This invention relates to a process for the production of CO and hydrogen or fuel gas from fossil fuels by reaction with oxygen. In one of its more specific aspects it is directed to a method of separating carbonaceous solid entrained in the gaseous products of reaction of fossil fuels and oxygen wherein said products are scrubbed with water and carbonaceous solid is separated from the scrubbing water.

The generation of fuel gas or CO and hydrogen by the partial oxidation of fossil fuels is a highly economic method of producing these gases. In the partial oxidation process, a fossil fuel, for example, coal, petroleum oil, or natural gas, is reacted with an oxygen-containing gas in a closed, compact reaction zone at an autogenous temperature within the range of about 1800° to 3500°F. preferably about 1800° to 2800°F. Preheating the reactants is generally desirable. The reaction zone is maintained at a pressure above about 10 pounds per square inch gauge and may be as high as about 3000 pounds per square inch gauge. Steam may be introduced into the reaction zone to assist in the dispersion of liquid fuel into the reactor, to assist in control of the reaction tempreture, and as a reactant to increase the relative amount of hydrogen produced. The product comprises for the most part carbon monoxide and hydrogen or when operated for the production of fuel gas carbon monoxide, hydrogen and methane and contains also varying amounts of water vapor, $CO_2$ and entrained carbonaceous solid in the form of fine carbon particles which are easily wet with water.

The amount of uncombined oxygen supplied to the reaction zone is limited so that near maximum yields of the desired product gases are obtained. Air, oxygen-enriched air or substantially pure oxygen may be employed in the process. Oxygen of high purity may be readily obtained by the rectification of air. Commercial oxygen plants, capable of delivering large amounts of high purity oxygen, typically produce oxygen streams containing in excess of 95 mol percent oxygen, and oxygen of this purity may be used per se or for enriching air.

Product gases issuing from the gas generation step contain a large amount of sensible heat. This heat may be employed to convert water to steam. For example, if the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases through heat exchanges or waste heat boilers. Steam for process or power use is advantageously produced in such waste heat boilers. Preheating of process streams, for example, fuel to the gas generation step, may be effected in heat exchangers. When the product gases are cooled by indirect heat exchange, it is preferred to cool the gases only to a temperature above the dew point at the prevailing pressure to avoid fouling of heat transfer surfaces occasioned by condenstaion of water and adhesion of entrained carbon.

The entrained carbon is effectively removed from the product gases by contacting the cooled synthesis gas with water in gas-liquid contact apparatus, for example, spray towers, bubble towers, venturi mixers and the like. Cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 0.5–1.0% solids for satisfactory pumpability. The solids content is controlled by withdrawing a portion of solids dispersion generally from the bottom of the scrubbing zone, removing the solids therefrom and returning clarified water to the top of the scrubbing zone. Since the amount of dispersion which must be processed for solids removal at a given carbon production rate varies inversely with the solids content of the dispersion, it is preferred to maintain the solids content of the dispersion withdrawn from the bottom of the scrubber at about 0.5–1.0%. However efficient washing may require higher liquid rates than the amount of liquid required to suspend the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressure makes possible the use of relatively high temperatures in the scrubbing zone, effects advantages in succeeding carbon separating steps, and delivers the product gas for use with a minimum of compression.

The separation of the carbon from the gaseous products of partial oxidation in the form of carbon-water dispersion produces large volumes of water containing about 0.5–1 wt. % carbon. Economics and the avoidance of water pollution require that the carbon be separated from at least a major portion of the water to permit reuse of the water and recovery of the carbon in useful form. It has been proposed to recover carbon from the scrubbing water by subjecting the water to intimate contact with a hydrocarbon liquid such as the fuel used in the generation of synthesis gas. However, since the fuel for the gas generator ordinarily is a heavy oil, separation of the oil-water mixture into an oil phase and a water phase frequently took a considerable length of time and on occasion troublesome emulsions were formed.

It has also been proposed to recover the soot by mixing the carbon-containing scrubbing water with a light hydrocarbon oil such as naphtha to transfer the soot from the scrubbing water to the naphtha and then allowing the mixture to settle into an oil phase and a water phase. After separation of the two phases, the soot-containing naphtha is mixed with the heavy oil used as fuel for the gas generator. The naphtha is then distilled from the heavy oil for reuse in the removal of the carbon from additional scrubbing water and the heavy oil containing carbon is fed to the gas generator. Such a procedure is disclosed in U.S. Pat. No.

2,992,906 to Frank E. Guptill, Jr. and has attained considerable commercial success. However, relatively large volumes of light hydrocarbon oil are used in the transfer of the carbon from the water to the light hydrocarbon since the hydrocarbon oil used to recover the carbon from the scrubbing water has been employed in an amount at least 5 and preferably 10–30 times the weight of carbon. The relatively large volumes of light hydrocarbon oil require a proportionately large decanter for the separation of the mixture into two phases and also require a proportionately large still for the separation of the light hydrocarbon oil from the fuel oil.

It is an object of the present invention to reduce the possibility of emulsion formation in the separation of the carbon-containing oil from the scrubbing water. Another object is to effect a better separation by producing an oil phase containing a minimum amount of water and a water phase containing a minimum amount of oil. Still another object is to reduce the settling time for the removal of the carbon from the water. Another object is to reduce the size of the still or fractionator used to remove the light hydrocarbon oil from the heavy hydrocarbon oil. These and other objects will be obvious to those skilled in the art from the following disclosure.

According to our invention, the carbon containing scrubbing water is mixed with a light hydrocarbon oil in an amount just sufficient to render the carbon hydrophobic. The mixture is allowed to settle and additional hydrocarbon liquid is added to the settling zone with minimal mixing to form a hydrocarbon-carbon slurry which is removed from the settling zone and may be used for the generation of additional synthesis gas or may be used as a furnace or boiler fuel. Clarified water is also removed from the settling zone and may be disposed of or subjected to further use such as scrubbing or may be introduced into the gas generation zone.

The hydrocarbon liquid or oil used in the initial mixing may be any hydrocarbon which is liquid under the operating conditions. It need not necessarily be pure. Any light hydrocarbon such as butanes, pentanes, hexanes, gasoline, naphtha, kerosene, light gas oils and the like and mixtures thereof may be used. The hydrocarbon liquids may also contain impurities such as sulfur-containing compounds, nitrogen-containing compounds, organic acids, etc. in minor amounts. The principal property of the oil is that its contact with the dispersed soot will render the soot hydrophobic. Preferably, the hydrocarbon liquid has an API gravity of at least 20°. Advantageously, a light hydrocarbon oil is used which is easily separable from the heavier hydrocarbon when such is used in the second addition such as by a simple flashing procedure.

The hydrocarbon liquid or oil is mixed with the water which ordinarily contains from about 0.5–1 wt. % carbon under conditions to give intimate contact between the oil and the dispersed carbon. It is not essential that the mixing be effected under conditions of extreme agitation although it has been found that because of the small amount of hydrocarbon liquid used, extreme agitation does not result in the formation of emulsions. The mixing may be effected by any conventional means.

The hydrocarbon oil is added in an amount just sufficient to render all of the carbon hydrophobic. As a result the carbon separates rapidly and substantially completely from the water and floats on the surface as a dry-appearing unagglomerated soot. The amount of oil to be added may be determined experimentally in a simple manner by sampling the scrubbing water and adding oil in increments with intermediate shaking until sufficient oil has been added to cause the carbon to separate rapidly and float on the surface of the clarified water. If the water phase is black, additional oil must be added. When the water phase is clear and the carbon is "dry" and fluffy, the amount of oil is optimum. When the carbon appears "wet" rather than "dry" and fluffy, the amount of oil should be decreased. The amount of oil added will roughly fall within the range between one and two times the oil adsorption number of the soot and may range between about 1.5 and 10 lbs. of oil per lb. of carbon or more likely between 1.5 and 5.

The mixture of light oil, carbon and water is introduced into a settling zone or decanter where the carbon associated with the oil rises rapidly to the surface of the water. Additional oil is added to the upper section of the settling zone or decanter with a minimum of mixing to prevent turbulence at the liquid interface. This secondary oil may be introduced, for example, through a sparger situated adjacent the interface or may be introduced at the bottom of the settling zone and passed upwardly through an adjustable standpipe and discharged adjacent to the interface. In the latter case the level of the discharge opening of the standpipe may be adjusted to compensate for variations in the location of the interface.

The secondary hydrocarbon oil may be any hydrocarbon oil such as is used in the initial addition. However, for economic reasons heavy fuel oil which is generally used as feed to the gas generation zone is preferred. The secondary oil should have a specific gravity such that there is no penetration of the upper oil layer into the lower water layer. If the density of the secondary oil is such that it results in an unsatisfactory formation of two separate liquid phases, this can be corrected by diluting it with a lighter oil such as a gas oil, kerosene, naphtha or the like. The secondary oil is added in an amount sufficient to form a dispersion of about 1–5 wt. % carbon in the oil.

The carbon which separates from the water phase is dispersed through the upper layer of oil by a minimum of agitation to prevent disturbance of the interface. The agitation may be provided by discharging the secondary oil adjacent to the interface of the two liquids in horizontal direction thereby effecting a sweeping action across the interface and dispersing the carbon throughout the upper phase. Other known mild forms of agitation may also be used.

The temperature of the settling zone or separator should be maintained at at least about 180°F. The upper temperature limit is not critical although it should not be in excess of the temperature at which the water-carbon suspension emerges from the scrubbing zone, usually about 475°F. Preferably, the temperature within the separator will range between about 250° and 350°F. The pressure in the settling zone should be sufficient to maintain both the hydrocarbon and the water in the liquid phase, suitably at least 100 psig and up to gas generation pressure. It is not necessary that the upper and lower layers be at the same temperature. However, on occasion when the specific gravities of the upper and lower liquids approximate each other, it may be advantageous to maintain the upper oil layer at a temperature above that of the lower water layer.

The gentle agitation of the upper layer permits the separated carbon to become dispersed therethrough and the resulting dispersion and the clarified water are withdrawn separately from the settling zone.

The principal advantage of our two-step addition procedure lies in the avoidance of the formation of emulsions regardless of whether or not emulsifying agents are present in either the light hydrocarbon oil or the water-carbon dispersion. In the initial addition the hydrocarbon is limited to that amount needed to render the soot hydrophobic so that it rapidly and substantially completely floats to the surface of the water and any amount in excess thereof is kept to a minimum. Emulsions are thus avoided as the oil is added in an amount less than will form a fluid hydrocarbon phase. The secondary hydrocarbon oil, which is added in amounts much larger than those of the initial addition, is added to the decanter or settling zone with a minimum of mixing with the water so that emulsion formation is avoided even if emulsifying agents are present. Our procedure which results in the avoidance of emulsions shows greatly improved operations with the same feeds which had given poor performance in conventional operation.

In a specific embodiment, where a residual fuel or a mixture thereof with a light hydrocarbon oil is used in the secondary addition, the resulting carbon-oil dispersion is transferred to a flashing zone where the light hydrocarbon oil is flashed off and the resulting residual fuel oil-carbon dispersion is utilized as feed to a synthesis gas generator or is used as boiler or furnace fuel.

The following example is submitted for illustrative purposes only and it should not be construed that the invention is limited thereto.

EXAMPLE

In this example, the dispersions are 1.5 wt. % carbon in water dispersions obtained by scrubbing synthesis gas produced by the partial oxidation of a residual fuel oil. In Runs A and B the initial oil is a 70° API naphtha but the secondary oil in Run A is naphtha and the secondary oil in Run B is a mixture containing 55% by weight California Reduced Crude and 45% by weight naphtha. For the initial naphtha addition a mixer valve is used and for the secondary addition the oil is passed upwardly through a standpipe and discharged against a distributor plate positioned just above the water level. Operating data are tabulated below.

| Feed Rates | A | B |
|---|---|---|
| Carbon, lb./hr. | 68.16 | 34.39 |
| Oil Adsorption Number, ml/g | 2.26 | 2.92 |
| Initial naphtha, lb./hr. | 283 | 170 |
| Initial naphtha: carbon, lb./lb. | 4.2 | 4.9 |
| Secondary oil, lb./hr. | 1136 | 688 |
| Total hydrocarbon, lb./hr. | 1419 | 858 |
| Total hydrocarbon: carbon, lb./lb. | 21 | 25 |
| Decanter Operation | | |
| Temperature, °F. | 277 | 301 |
| Pressure, psig | 150 | 264 |
| Decanter Performance | | |
| % H$_2$O in hydrocarbon—carbon dispersion | 2.18 | 4.64 |
| % carbon " | 4.48 | 3.68 |

These data show substantially complete removal of carbon from the scrubbing water and also show that the upper hydrocarbon-carbon layer contains less than 5% water. In addition, because of the small amount of naphtha used in the initial addition and the minimal intermixing of water and oil during the secondary addition, the possibility of emulsion formation in the decanter is substantially eliminated.

Obviously, various modifications of the invention as hereinbefore set forth may be made without departing from the spirit and scope thereof, and therefore, only such limitations should be made as are indicated in the appended claims.

We claim:

1. In a process in which a fossil fuel is subjected to partial oxidation to produce a gas comprising hydrogen and carbon monoxide and containing entrained carbon particles and from which gas the carbon particles are removed by scrubbing with water to produce a carbon-water dispersion, the improved two-stage hydrocarbon addition method of recovering carbon from said water dispersion in the form of a carbon-hydrocarbon oil dispersion which comprises mixing with said dispersion a light hydrocarbon oil in an amount just sufficient to render all of said carbon hyrophobic, said amount of light hydrocarbon oil on a weight basis being between 1 and 2 times the oil adsorption number of said carbon, passing the resulting mixture to a settling zone to permit the carbon to rise to the surface of the water, adding additional hydrocarbon oil to said settling zone adjacent the water surface to form an upper hydrocarbon oil layer containing dispersed carbon and a lower water layer, the amount of additional hydrocarbon oil being sufficient to form a carbon-hydrocarbon oil dispersion containing between 1 and 5 weight percent carbon and separately removing water and carbon-hydrocarbon oil dispersion from said settling zone.

2. The process of claim 1 in which the hydrocarbon oil mixed with the water-carbon dispersion is a petroleum fraction boiling within the naphtha range.

3. The process of claim 1 in which the hydrocarbon oil used to form said hydrocarbon oil-carbon dispersion comprises a petroleum residuum.

4. The process of claim 3 in which the hydrocarbon oil mixed with the water-carbon dispersion is a petroleum fraction boiling in the naphtha range.

5. The process of claim 4 in which the naphtha fraction is flashed from said hydrocarbon oil-carbon dispersion after its removal from the settling zone.

6. The process of claim 5 in which after the flashing of the naphtha the hydrocarbon oil-carbon dispersion remaining is used as feed to the partial oxidation process.

7. The process of claim 1 in which the carbon-water dispersion is mixed with a liquid consisting essentially of a hydrocarbon oil.

8. The process of claim 1 in which the carbon-hydrocarbon oil dispersion is used as feed to the partial oxidation process.

9. The process of claim 8 in which the carbon-hydrocarbon oil dispersion is subjected to flash distillation to remove lighter components and the residual hydrocarbon oil-carbon dispersion is used as feed to the partial oxidation process.

* * * * *